United States Patent [19]
Clavin

[11] 3,890,905
[45] June 24, 1975

[54] APPARATUS FOR DRIVING A DEVICE WITHIN A PIPE

[75] Inventor: Edward A. Clavin, Houston, Tex.

[73] Assignee: CRC-Crose International, Inc., Houston, Tex.

[22] Filed: Feb. 1, 1974

[21] Appl. No.: 438,645

[52] U.S. Cl. ...... 104/138 G; 15/104.09; 15/104.12; 254/134.5; 269/48.1
[51] Int. Cl.² . B61B 13/10; B23B 31/40; B08B 9/04
[58] Field of Search....... 15/104.05, 104.09, 104.12, 15/104.13, 104.14; 104/138, 138 G; 118/105, 306, 254, 408, DIG. 10; 134/166 C, 167 C, 168 C, 169 C; 228/44; 269/34, 48.1, 50, 52; 254/134.5

[56] References Cited
UNITED STATES PATENTS

| | | | |
|---|---|---|---|
| 2,455,273 | 11/1948 | Schott et al. | 15/104.13 X |
| 3,703,947 | 11/1972 | Landrum | 118/408 X |

FOREIGN PATENTS OR APPLICATIONS

| | | | |
|---|---|---|---|
| 1,046,780 | 7/1953 | France | 254/134.5 |

*Primary Examiner*—Roy Lake
*Assistant Examiner*—Neil Abrams
*Attorney, Agent, or Firm*—Jack R. Springgate; William L. LaFuze

[57] ABSTRACT

An apparatus for driving devices such as pigs, alignment clamps and mandrels through the inside of a pipe having a pair of counter-rotating drive members with wheels attached thereto at angles, whereby rotation of the drive members produces a driving force to move the apparatus and device through the pipe. The drive wheels are spring loaded for constant and effective engagement with the interior walls of the pipe, and the angle of said wheels can be preset at one of a plurality of angles.

13 Claims, 4 Drawing Figures

3,890,905

APPARATUS FOR DRIVING A DEVICE WITHIN A PIPE

BACKGROUND OF THE INVENTION

This invention relates to apparatus for use within pipes, and more particularly, to a counter-rotating drive mechanism for moving devices through pipes axially.

Mechanisms for driving devices within pipes which are known in the art typically consist of wheels which engage the interior surface of the pipe wherein the axes of the wheels are perpendicular to the axis of the pipe. Such a drive mechanism for a pipe clamp has been disclosed by E. E. Cummings in U.S. Pat. No. 3,044,431. A particular disadvantage of driving mechanisms such as that of Cummings is the excessive wear to the wheels due to the nature of the contact of the wheel with the pipe. The excessive wear results from the fact that the wheel must travel along the interior surface of the pipe which is curved and is not flat. Since the wheel contacts the surface of the pipe at various distances from the center of rotation of the wheel, portions of the wheel contacting the pipe at different distances from the center of rotation travel at different linear velocities in a direction along the axis of the pipe. This results in a "skidding" of the portions of the wheel which contact the surface of the pipe which do not have linear velocities identical to the linear velocity of the axis of the wheel. The apparatus disclosed herein is an improved driving apparatus which reduces the wear on the driving wheels by substantially reducing the skidding of the wheels as the wheels engage the interior surface of the pipe.

SUMMARY

The apparatus disclosed herein is an improved mechanism for producing a force to move devices such as pigs, alignment clamps and mandrels through pipes. The apparatus consists of at least one rotating drive member which rotates in a plane perpendicular to the axis of the pipe in which the apparatus resides. If more than one rotating drive member is utilized, alternate drive members rotate in opposite directions to eliminate torque problems. Therefore it is desirable, although not imperative, to have an even number of rotating drive members such that the net torque produced by the rotation of the drive members is negligible. Wheels are attached to the rotating drive members so that they engage the interior surface of the pipe at an angle to the plane of rotation resulting in a driving force along the axis of the pipe when the drive members are rotated. The wheels are spring loaded to ensure constant and effective engagement with the pipe. The magnitude of this force created by the drive apparatus depends both on the speed of rotation of the drive members and the angle at which the wheels are set in the drive members, which angle is preferably variable.

It is therefore an object of the invention to provide an improved drive apparatus having a minimum of wear of the driving wheels.

It is a further object of the invention to provide an improved apparatus for driving devices through pipes.

It is still a further object of the invention to provide an improved drive mechanism for exerting a driving force on internal pipe devices such as mandrels, alignment clamps and pigs.

It is still a further object of this invention to provide a new and improved drive apparatus having firm engagement with the inside of a pipe with a minimum of skidding.

It is a further object of the invention to provide an improved drive mechanism wherein the torque exerted by the drive mechanism is negligible.

BRIEF DESCRIPTION OF THE DRAWINGS

The foregoing and other objects, features and advantages of the invention will be apparent from the following more particular description of a preferred embodiment of the invention as illustrated in the accompanying drawings in which.

DESCRIPTION OF THE PREFERRED EMBODIMENTS

Figure 1:
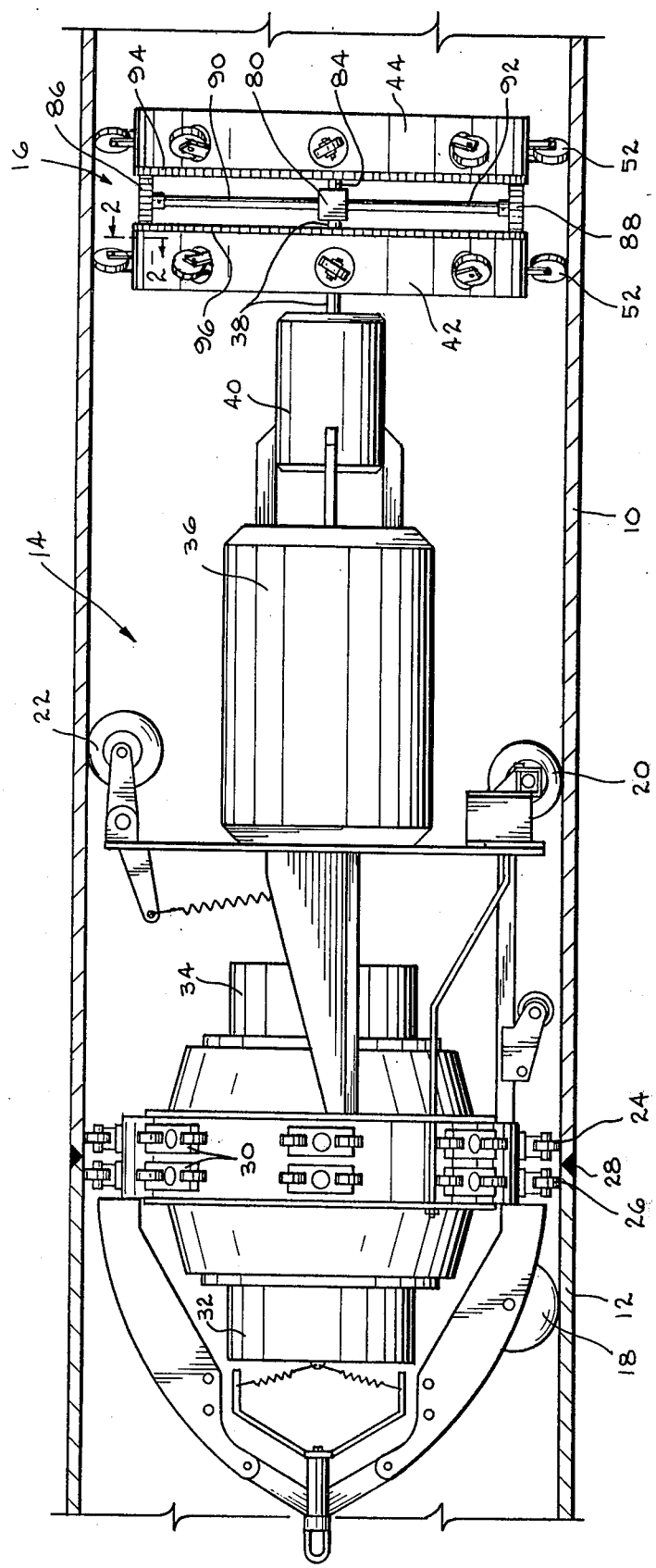
FIG. 1 shows an internal pipe clamp within a pipe having improved driving means constructed in accordance with the present invention.

Referring to FIG. 1, pipes 10 and 12 are illustrated having an internal pipe alignment device clamp 14 therein which is driven through pipes 10 and 12 by a driving mechanism 16 which is constructed in accordance with the present invention.

Pipe alignment clamp devices are known in the art and a device similar in construction and operation to alignment clamp device 14, but having a different driving mechanism acting thereon, is disclosed in Pat. No. 3,044,431, "Internal Pipe Clamp" whose inventor is E. E. Cummings.

The pipe clamp 14 is supported for travel within pipes 10 and 12 by wheels 18, 20 and 22. In typical operation the pipe clamp 14 is positioned in relation to the two pipes 10 and 12 such that the clamp rollers 24 and 26 are positioned on either side of the joint 28 between the two pipes 12 and 10. The rollers 26 and 24 are mounted on plungers 30 such that the rollers 24 and 26 firmly engage the interior of the pipe when the plungers 30 are extended outwardly from the axes of the pipes 12 and 10. The purpose of the clamp rollers is to position the two pipes 10 and 12 into approximate aligned abutment for proper welding at the joint 28. The plungers 30 are powered by piston motors 32 and 34 which are activated by air pressure storage tank 36 which contains an actuating fluid therein.

The drive mechanism 16 is used to impart a force on the pipe alignment clamp 14 in a direction along the axis of the pipe 10. The drive mechanism 16 is powered via shaft 38, which is more fully described hereinafter, by a fluid motor 40 which in turn is driven by actuating fluid from storage tank 36.

In the preferred embodiment the drive apparatus 16 comprises two counter-rotating drive members 42 and 44. Each drive member, as illustrated in the sectional view of FIG. 2, comprises a circular rim 46 which is suitably supported by a plurality of spokes 48 extending outwardly from the hub 50 at the axial center of the drive member.

Mounted on the rim 46 of each drive member 42 and 44 are a plurality of wheels 52. The means for mounting each wheel 52 on the rim 46 of each drive member comprises an axle 54, two sets of parallel support legs 56 and 58 having springs 60 and 62 positioned therein, respectively, a mounting plate 64 and two mounting bolts 66 and 68. The mounting plate 64 is secured to the rim 46 of drive member 42 by means of two threaded mounting bolts 66 and 68. The two sets of parallel support legs 56 and 58 are welded or otherwise suitably secured to mounting plate 64 such that the support legs 56 and 58 extend outwardly from the rim 46. The support legs 56 and 58 have slots 70 therein for receiving the ends of axle 54 which passes through the center of the wheel 52 for rotational support thereof. Both ends of the axle 54 are threaded for receiving suitably threaded nuts 72 and 74 whereby the axle 54 is mounted between the support legs 56 and 58 for movement radially with respect to the pipes 10 and 12. Within each set of parallel support legs 56 and 58 are confined springs 60 and 62 respectively. The springs 60 and 62 abut the mounting plate 64 on one end and the axle 54 on the other end, thus biasing the axle and wheel in the outward position from the rim 46 to hold the wheels 52 in tight driving engagement with the interior of pipes 10 and 12.

Figure 4:
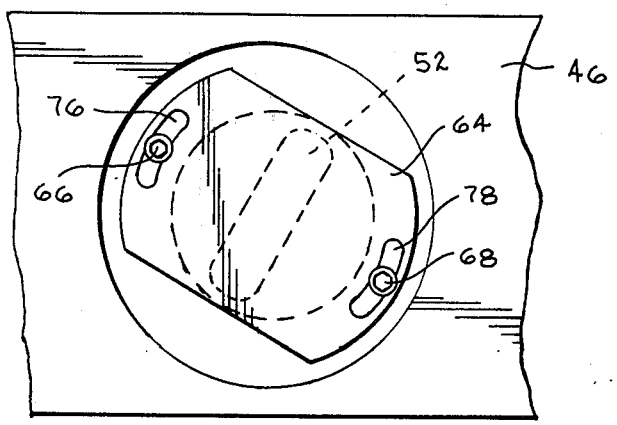
FIG. 4 is a view taken along line 4—4 in FIG. 3 showing the interior of the drive member to illustrate the mounting of the drive wheel.

A means for preselecting the angle of the wheel 52 with respect to the rim 46 is included to preset the forward movement developed responsive to the rotation of the drive members 42 and 44. As illustrated in FIG. 4, the mounting plate 64 is secured to the rim 46 by means of threaded mounting bolts 66 and 68 which pass through arcuate slots 76 and 78 of the mounting plate 64 and tighten into the rim 46. The mounting bolts 66 and 68 can be loosened to slidably adjust the mounting plate 64 to thereby preselect the desired angle of the wheel 52 with respect to the rim 46.

Referring again to FIG. 1, the preferred embodiment of the apparatus comprises two counter-rotating drive members 42 and 44. However, it is to be understood that any number of drive members can be implemented without departing from the scope of the invention as described herein. It is preferred that the apparatus contain an even number of counter-rotating drive members however, since torque problems are minimized when adjacent drive members are rotating in opposite directions.

Figure 2:
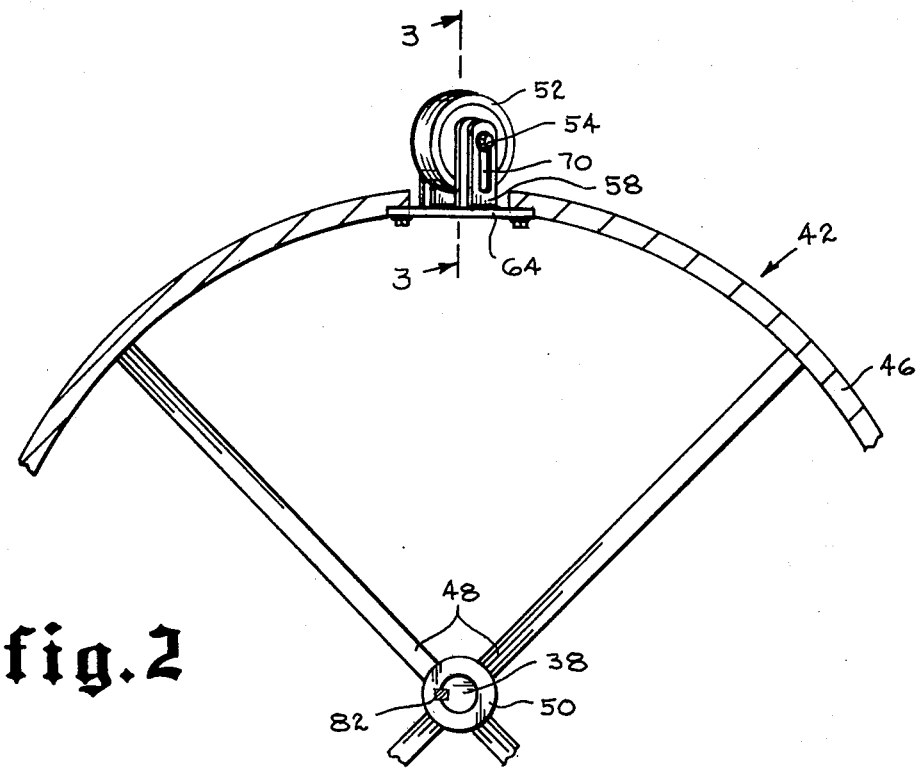
FIG. 2 is a partial sectional view taken along line 2—2 in FIG. 1 showing the drive member structure.
Figure 3:
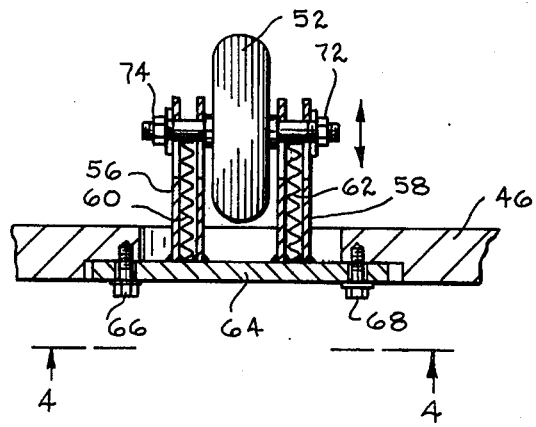
FIG. 3 is another partial sectional view taken along line 3—3 in FIG. 2 showing the support and spring structure of a wheel.

A means for rotating the two drive members 42 and 44 comprises the drive shaft 38, the pressure actuated motor 40, and the gear means 80. As shown in FIG. 2, the drive shaft 38 and the drive member 42 are fastened together at the hub 50 by a key 82 or other suitable locking means for preventing relative rotational displacement between the shaft 38 and drive member 42. The shaft 38 extends through the hub 50 and into gear box 80. The gear box is a device whose construction and operation are known in the art which performs the function of driving shaft 84 in an opposite rotational direction to that of shaft 38 but with the same rotational velocity as shaft 38. The shaft 84 is connected to the hub of drive member 44 by a suitable locking key, similar to the locking structure as shown in FIG. 2, for driving said drive member 44.

A means for spacing the drive members 42 and 44 comprises the pinion members 86 and 88 mounted on the ends of connecting rods 90 and 92. The teeth on pinion members 86 and 88 are in engagement with the teeth 94 and 96 on the edges of the rims of drive members 42 and 44. The pinion members 86 and 88 serve the purpose of engaging the two drive members 42 and 44 to maintain the desired spacing between the drive members 42 and 44 during operation thereof. Two connecting rods 90 and 92 are supported by the gear box 80.

Another embodiment of the invention is suggested which comprises the components of FIG. 1 with only slight modifications thereof. In the embodiment of the invention previously described, the aggregation of pinions 86 and 88, rods 90 and 92, the gear means 80, rotate in a plane parallel to that of the plane of rotation of drive members 42 and 44 for the purpose of providing spacers for drive members 42 and 44. In the first embodiment the drive members 42 and 44 are driven by drive shaft 38 and shaft 84, respectively. In a second embodiment the drive members 42 and 44 could be driven by pinions 86 and 88. This is accomplished by providing sleeves over drive shaft 38 and shaft 84 and removing the locking keys which connect the shafts 38 and 84 to the drive members 42 and 44. The drive members 42 and 44 in this alternative embodiment would then be rotatably mounted on the sleeves of drive shaft 38 and shaft 84 so that no energy is imparted to drive members 42 and 44 by drive shaft 38 and shaft 84. By fixing the gear means 80 to the sleeves of drive shaft 38 and shaft 84 so that the gear box 80 does not rotate with respect to the pipe, the gear box 44 could then transmit the rotational energy of drive shaft 38 to rods 90 and 92, thus imparting a driving rotational force to drive members 42 and 44 via pinions 86 and 88.

A third embodiment of the invention is suggested which is best explained with reference to FIG. 1 wherein certain components shown therein are slightly modified. In this third embodiment shaft 38 is a sleeve which houses shaft 84, shaft 84 extending from motor 40 which drives shaft 84 rotationally. Sleeve 38 is rigidly secured to the stationary housing of motor 40. In this embodiment drive member 42 is rotatably mounted on sleeve 38 by bearings or other suitable means (not shown) and no key 82 (see FIG. 2) is present for use with drive member 42. Unit 80 in this embodiment becomes a simple housing instead of a gear box, said housing being rigidly secured to stationary sleeve 38. Housing 80 in this embodiment rotatably supports the ends of connecting rods 90 and 92 by bearing or other suitable means. Rotatable shaft 84 is secured to drive member 44 by a locking key 82 as in the first embodiment whereby shaft 84 imparts a rotational force to drive member 44. In operation of the third embodiment rotation of drive member 44 as a result of a rotation of shaft 84 causes pinion members 86 and 88 to rotate on rods 90 and 92, respectively, to which they are rigidly attached. Pinion members 86 and 88, which engage the teeth of drive members 42 and 44 as in the first embodiment, and which are turned by the rotation of drive member 44, cause drive member 42 to rotate in a direction opposite from drive member 44 but with equal rotational velocity.

Thus, it is evident from the foregoing that an invention has been provided for driving devices through pipes while preventing excess wear of the driving wheels. Further, the invention creates a driving force to move devices through pipes by pairs of counter-rotating drive members which counter balance and substantially eliminate torque problems.

While the invention has been particularly shown and described with reference to a preferred and alternate embodiment thereof, it will be understood by those skilled in the art that the foregoing and other changes in form and detail may be made therein without departing from the spirit and scope of the invention.

What is claimed is:

1. An apparatus for driving a device within a pipe comprising:
   a. a first drive member, said first drive member having its axis coincidental with the axis of said pipe, said first drive member having a first rim thereon, said first drive member having a hub at its center of rotation and a plurality of spokes supporting said rim which extend between said hub and the interior of said rim;
   b. a second drive member, said second drive member having its axis coincidental with the axis of said pipe, said second drive member having a second rim thereon, said second drive member having a hub at its center of rotation and a plurality of spokes supporting said rim which extend between its hub and the interior of its rim;
   c. a plurality of wheels;
   d. means for mounting said plurality of wheels on the rims of said first and second drive members, said wheels extending outwardly from said first and second rims to engage the interior of said pipe; and
   e. means for rotating each of said first and second drive members in opposite directions about their axes whereby engagement of said wheels against the interior of said pipe develops a driving force to move the device through the pipe.

2. The apparatus of claim 1 wherein the means for mounting said plurality of wheels on said first and second rims includes means for presetting the angle of each wheel with respect to the drive member to which it is mounted.

3. The apparatus of claim 1 wherein the means for rotating each of said first and second drive members comprises:
   a. drive shaft means;
   b. means for rotating said drive shaft means; and
   c. means for transmitting the rotational forces of said drive shaft means to said first and second drive members, said transmitting means causing said first and second drive members to rotate about their axes in opposite directions.

4. The apparatus of claim 3 wherein said means for transmitting the rotational forces of said drive shaft means to said first and second drive members comprises:
   a. means for securing the hub of said first drive member to said drive shaft means;
   b. second shaft means, said second shaft means passing through the hub of said second drive member;
   c. means for securing the hub of said second drive member to said second shaft means;
   d. gear means, said gear means driven by said drive shaft means, said gear means driving said second shaft means in a direction opposite and equal in magnitude to that of said drive shaft means.

5. The apparatus of claim 1 wherein said mounting means includes spring means biasing said wheels into driving engagement with the interior of the pipe through which the apparatus is to move.

6. An apparatus for driving a device within a pipe, comprising:
   a. a first drive member, said first drive member positioned in a pipe such that the rotation of said first drive member is in a plane perpendicular to the axis of said pipe;
   b. wheel means;
   c. means for mounting said wheel means on said first drive member in angular relationship to the plane of rotation of said first drive member, said wheel means extending outwardly from said first drive member and adapted to be in driving engagement with the interior of said pipe;
   d. means for rotating said first drive member whereby engagement of said wheel means against the interior of said pipe develops a driving force to move the device through the pipe.
   e. a second drive member rotating in the opposite direction to counterbalance the torque resulting from the rotation of the first drive member.
   f. means for spacing said first and second drive members including
      i. pinion means positioned between said drive members, said pinion means having teeth thereon, said drive members having means for receiving the teeth of said pinion means; and
      ii. support means securing said pinion means in a position between said drive members such that the teeth of said pinion means continually engage the means for receiving said teeth on said member means.

7. An apparatus for driving a device within a pipe comprising:
   a. a first circular drive member, said first drive member having its axis coincidental with the axis of said pipe, said first drive member having a first rim thereon;
   b. a second circular drive member, said second drive member having its axis coincidental with the axis of said pipe, said second drive member having a second rim thereon;
   c. at least one wheel for each drive member;
   d. means for mounting said wheels on the rims of said first and second drive members, said wheels extending radially outwardly from said first and second rims to engage the interior of said pipe; and
   e. means for rotating each of said first and second drive members in opposite directions about their axes whereby engagement of said wheels against the interior of said pipe develops a driving force to move the device through the pipe.

8. The apparatus of claim 7 wherein the means for mounting said wheels on said first and second rims includes means for presetting the angle of each wheel with respect to the drive member to which it is mounted.

9. The apparatus of claim 7 wherein the means for rotating each of said first and second drive members comprises:
   a. drive shaft means;
   b. means for rotating said drive shaft means; and
   c. means for transmitting the rotational forces of said drive shaft means to said first and second drive members, said transmitting means causing said first and second drive members to rotate about their axes in opposite directions.

10. The apparatus of claim 9 wherein said first drive member includes a hub at its center of rotation and a plurality of spokes supporting said first rim, said spokes extending between said hub and the interior of said rim.

11. The apparatus of claim 10 wherein said second drive member includes a hub at its center of rotation and a plurality of spokes supporting said second rim, said spokes extending between its hub and the interior of said second rim.

12. The apparatus of claim 11 wherein said means for transmitting the rotational forces of said drive shaft means to said first and second drive members comprises:

a. means for securing the hub of said first drive member to said drive shaft means;
b. second shaft means, said second shaft means passing through the hub of said second drive member;
c. means for securing the hub of said second drive member to said second shaft means;
d. gear means, said gear means driven by said drive shaft means, said gear means driving said second shaft means in a direction opposite and equal in magnitude to that of said drive shaft means.

13. The apparatus of claim 7 wherein said mounting means includes spring means biasing said wheels into driving engagement with the interior of the pipe through which the apparatus is to move.

* * * * *